(12) United States Patent
Gross

(10) Patent No.: US 7,443,886 B1
(45) Date of Patent: Oct. 28, 2008

(54) COMMUNICATION PROTOCOL SYSTEM AND METHOD

(75) Inventor: Ronald Gross, North Hampton, NH (US)

(73) Assignee: Schneider Automation Inc., North Andover, MA (US)

( * ) Notice: Subject to any disclaimer, the term of this patent is extended or adjusted under 35 U.S.C. 154(b) by 153 days.

(21) Appl. No.: 10/137,192

(22) Filed: Apr. 30, 2002

(51) Int. Cl.
*H04J 3/00* (2006.01)

(52) U.S. Cl. ..................................... 370/476

(58) Field of Classification Search ................ 370/465, 370/474, 476, 389, 392, 254; 709/208, 209
See application file for complete search history.

(56) References Cited

U.S. PATENT DOCUMENTS

| | | | |
|---|---|---|---|
| 5,952,932 A | 9/1999 | Sorensen | |
| 6,006,286 A * | 12/1999 | Baker et al. | ................... 710/22 |
| 6,011,806 A | 1/2000 | Herring | |
| 6,097,316 A | 8/2000 | Liaw et al. | |
| 6,263,001 B1 | 7/2001 | Banks | |
| 6,373,815 B1 * | 4/2002 | Ishida et al. | ............. 369/275.3 |
| 6,839,785 B2 * | 1/2005 | Massie | ....................... 710/300 |
| 2003/0225956 A1 * | 12/2003 | Riley et al. | ................. 710/309 |

OTHER PUBLICATIONS

"TSX Momentum—M1 Processor Adapter and Option Adapter User Guide," Schneider Electric; Version 3.0, Jul. 1999.

* cited by examiner

*Primary Examiner*—Ajit Patel

(57) ABSTRACT

A communication protocol comprising a data packet, a control byte, and a check sum byte. The data packet having a plurality of data words wherein each data word comprises a first byte and a second byte. The control byte having a first address bit, a second address bit, and a third address bit for identifying an address of a slave controller, a type bit following the first address bit, the second address bit, and the third address bit for identifying a data type within said data packet, a direction bit following the type bit for identifying a source of the data frame, a content bit following the direction bit for identifying whether said data packet comprises data, a state bit following the content bit for identifying a state of a master controller, and a run/stop bit following the state bit for identifying a run/stop state of the master controller. The protocol comprises a check sum byte to ensure correct transmission of the data packet and control byte.

39 Claims, 4 Drawing Sheets

| Byte # | Name | Description |
|---|---|---|
| 1 | Control Byte | Refer to Table 4: KNET Control Byte Format |
| 2, 3 | Data Word 1 | First data word, low byte first |
| 4, 5 | Data Word 2 | Second data word, low byte first |
| 6, 7 | Data Word 3 | Third data word, low byte first |
| 8, 9 | Data Word 4 | Fourth data word, low byte first |
| 10 | Check Byte | 2's complement ADD check of Control Byte and Data Words |

FIG.2

COMMUNICATION PROTOCOL SYSTEM AND METHOD

TECHNICAL FIELD

The present invention is generally related to communication system protocols and, more particularly, is related to a communication protocol system and method between a master controller and a slave controller.

BACKGROUND OF THE INVENTION

Special hardware and software is required to exchange information in a factory automation device system. Such factory automation device systems typically comprise a master controller and one or more slave controllers. An efficient use of the communication protocol is necessary to facilitate a high-speed exchange of data between the master controller and the slave controllers.

Communications between a master controller and a slave controller typically comprise instructions associated with various operating parameters of the system. An important aspect of the information exchange is that it be high-speed and efficient. A control byte that is not configured efficiently can impair the communication speed. Depending on the hardware and software associated with the system, a particular sequence of a control byte can enhance performance of a communication protocol in exchanging data between a master controller and a slave controller.

Thus, a heretofore-unaddressed need exists in the industry to address the aforementioned deficiencies and inadequacies.

SUMMARY OF THE INVENTION

The present invention provides a communication protocol system and method for communicating a small amount of data between a master controller and one or more slave controllers.

In general terms, the protocol can be implemented as a data packet having a plurality of data words wherein each data word comprises a first byte and a second byte. A control byte having a first address bit, a second address bit, and a third address bit for identifying an address of a slave controller, a type bit following the first address bit, the second address bit, and the third address bit for identifying a data type within the data packet, a direction bit following the type bit for identifying a source of a data frame, a content bit following the direction bit for identifying whether the data packet comprises data, a state bit following the content bit for identifying a state of a master controller, and a run/stop bit following the state bit for identifying a run/stop state of the master controller. The protocol further comprises a check sum byte to ensure correct transmission of the data packet and control byte.

The present invention can also be viewed as providing a method for transmitting a data frame between a master controller and a slave controller.

In one embodiment the method includes generating a data frame wherein the data frame comprises a control byte having a first address bit, a second address bit, and a third address bit for identifying a slave controller, a type bit following the first address bit, the second address bit, and the third address bit for identifying a data type in a data packet, a direction bit following the type bit for identifying a source of the data frame, a content bit following the direction bit for identifying whether the data packet comprises data, a state bit following the content bit for identifying the state of the master controller, and a run/stop bit following the state bit for identifying a run/stop state of the master controller.

If the source of the data frame is the master controller, the next step is transmitting the data frame from the master controller to a slave controller, wherein the data frame is interpretable by the slave controller. Alternatively, if the source of the data frame is the slave controller, the next step is transmitting the data frame from the slave controller to the master controller, wherein the data frame is interpretable by the master controller.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a graphical representation of a byte allocation format in which data is communicated according to the present invention;

DETAILED DESCRIPTION

Figure 1:
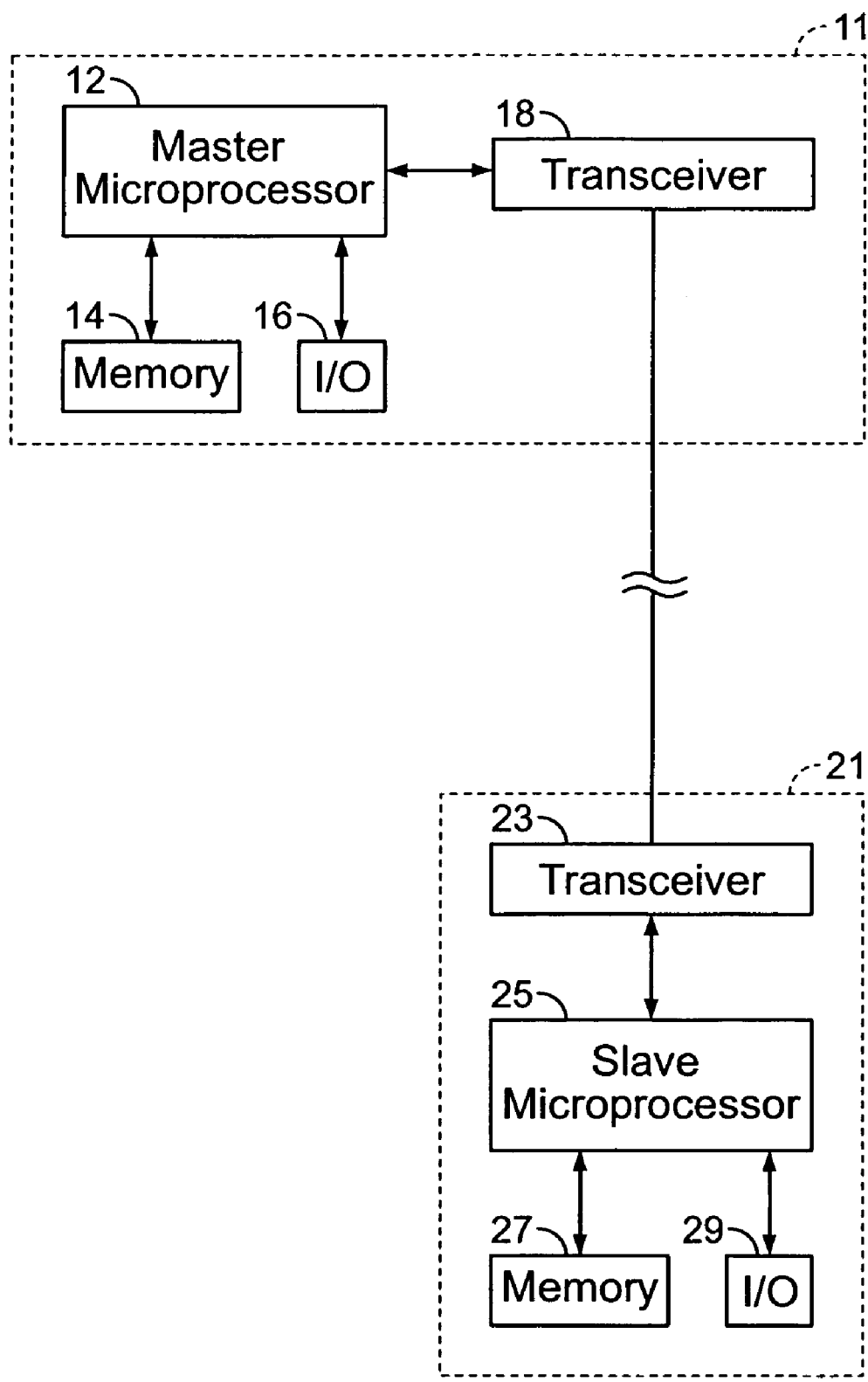
FIG. 1 is a block diagram of a master controller unit and a slave controller unit in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

The present invention is preferably used with a Twido System manufactured by Schneider Automation. The Twido System provides for communication between a master controller 11 and a slave controller 21 as shown in FIG. 1. The master controller 11 includes a master processor 12, memory 14, and one or more input and/or output (I/O) devices 16 (or peripherals) that are communicatively coupled to a transceiver 18. The transceiver 18 is responsible for communication with a slave controller 21 over a communication medium. The communication medium supports serial communication between the master controller 11 and the slave controller 21. The communication medium can be, for example but not limited to, one or more serial buses or other wired or wireless serial connections, as is known in the art. The transceiver 18 may have additional elements, which are omitted for simplicity, such as controllers, buffers (caches), drivers, repeaters, and receivers, to enable communications. Further, the transceiver 18 includes address, control, and/or data connections to enable appropriate communications between the master controller 11 and the slave controller 21. Preferably, the data connection is configured for EIA-485.

The master processor 12 of the Twido System is a hardware device for executing software, particularly that stored in memory 14. The master processor 12 preferably is a M16C series microprocessor from Mitsubishi Electric Corporation.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the master processor 12.

The software in memory 14 may include one or more separate programs, each of which comprises an ordered listing of executable instructions for implementing logical functions. In the example of FIG. 1, the software in the memory 14 includes a suitable operating system (O/S). Preferably, the operating system is a Twido operating system. The operating system essentially controls the execution of other computer programs and provides scheduling, input-output control, file and data management, memory management, and communication control and related services.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate both inputs and outputs, for instance but not limited to, an actuator for controlling a device, a switch, a modulator/demodulator (modem; for accessing another device, system, or network), a radio frequency (RF) or other transceiver, a telephonic interface, a bridge, a router, etc.

If the master controller 11 is a PC, workstation, or the like, the software in the memory 14 may further include a basic input output system (BIOS) (omitted for simplicity). The BIOS is a set of essential software routines that initialize and test hardware at startup, start the O/S, and support the transfer of data among the hardware devices. The BIOS is stored in ROM so that the BIOS can be executed when the master controller 11 is activated.

When the master controller 11 is in operation, the master processor 12 is configured to execute software stored within the memory 14, to communicate data to and from the memory 14, and to generally control operations of the master controller 11 pursuant to the software.

The slave controller 21 includes a transmitter and receiver device 23 allowing a slave processor 25 to communicate with the master controller 11. The master controller 11 transmits information in a communication protocol to be interpreted by the slave processor 25. The slave processor 25 is connected to an input/output module 29 and a memory 27. The input/output module 29 comprises drivers and appropriate interfaces to sensors. The input/output module is configured such that it is possible to control a system such as an assembly line, a robot, an actuator, and/or any device with switches.

The slave controller 25 is configured to communicate with the master controller 11 on a MODBUS protocol, an ASCII protocol, or a Remote Link protocol. Each protocol can be configured to communicate on a first port and/or a second port depending on the system configuration. The MODBUS protocol is a master-slave protocol that allows for the master controller 11 to request responses from the slave controllers 21. In the MODBUS protocol, the master controller 11 can address individual slave controllers 21, or can initiate a broadcast message to up to seven slave controllers 21. The slave controllers 21 respond to a message that is addressed to them individually. The ASCII protocol is a half-duplex character mode protocol used to transmit and/or receive a character string to/from a simple device such as a printer or terminal. Finally, the Remote Link protocol is used for remote link communications. The Remote Link protocol is used to efficiently exchange small amounts of data between a master controller 11 and a slave controller 21 in the Twido System as described below.

The Remote Link protocol is a high speed master/slave bus for communicating a small amount of data between the master controller 11 and up to seven slave controllers 21 of the system, wherein each slave controller 21 has a unique address. FIG. 2 is a graphical representation of a byte allocation format in which a data frame 31 is communicated. The data frame 31 comprises a control byte 33, a data packet 35 associated with the control byte, and a check sum 37. The check sum is calculated as an eight bit truncated two's complement addition of the control byte and the succeeding data bytes. N is the number of data words that succeeds the control byte. Preferably, the data packet 35 comprises four data words succeeding the control byte wherein each data word comprises a first byte and a second byte. This format is used whenever a command is transmitted. Furthermore, most single chip microprocessors are byte-oriented thus making this byte format feasible.

Figure 3:
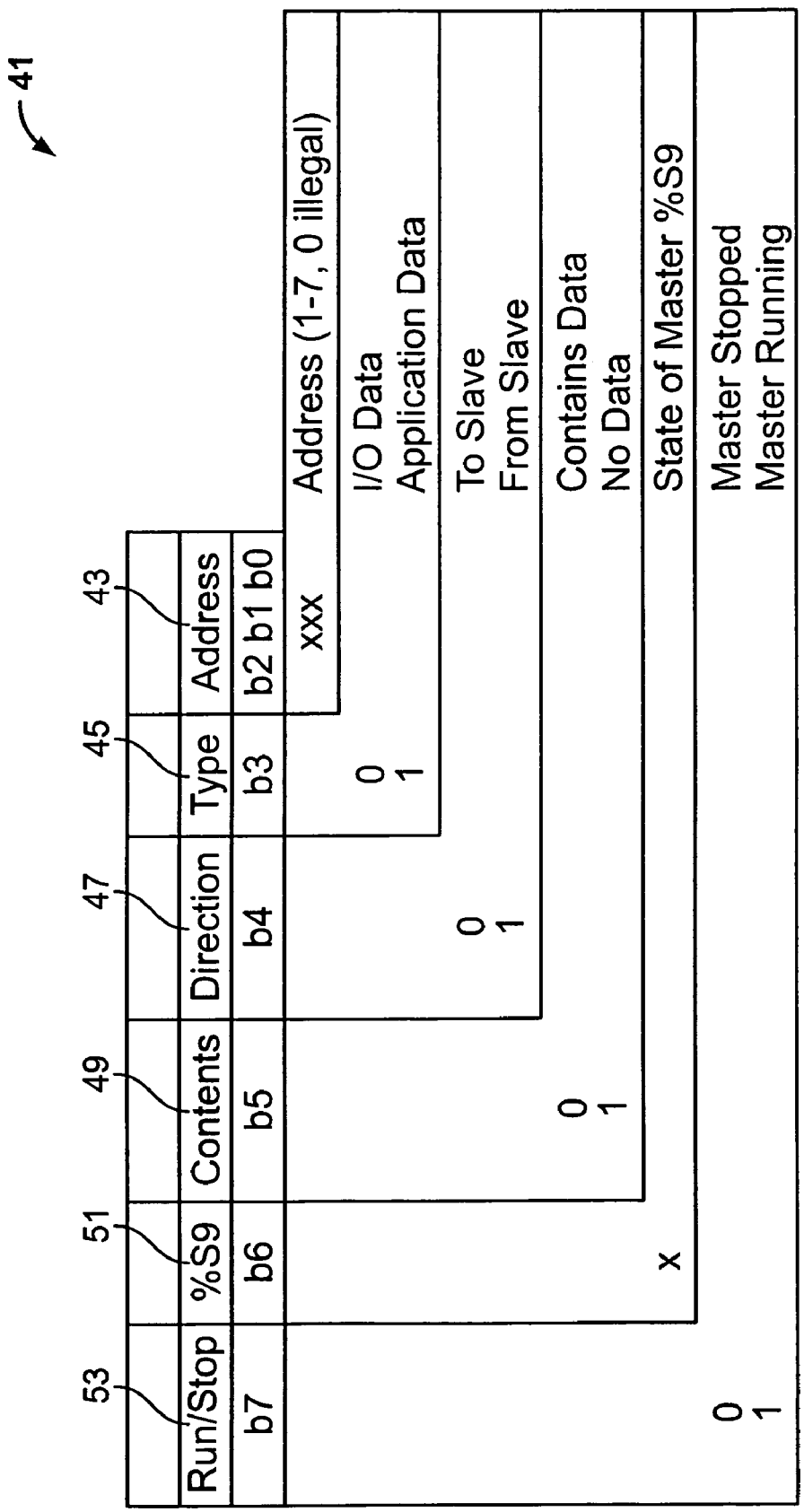
FIG. 3 is a graphical representation of a bit allocation in a control byte according to the present invention.

In order for the system to function as efficiently as possible, a unique control byte is utilized. FIG. 3 is the preferred bit allocation of a control byte for the Remote Link protocol according to the present invention. The control byte 41 has eight (8) bits, b0–b7. The control byte 41 comprises an address identifier 43 having three (3) bits, b0–b2. The address identifier 43 identifies the address of the slave controller 21 that is being queried or the address of the slave controller 21 that is responding to data transmitted by the master controller 11. The address bits 45 allow for up to seven slave controllers 21 to be identified. The master controller 11 uses the remaining address.

A type identifier 45 having one (1) bit, b3, is set in the control byte to immediately follow the address bits 43. The type bit 45 indicates the type of data in the data packet 35 being exchanged between the master controller 11 and the slave controller 21. In the preferred embodiment, setting the type bit 45 low (i.e., a binary "0") indicates that "input/output data" is being exchanged between the master controller 11 and the slave controller 21. The slave controller 21 is configured as a remote input/output device when exchanging input/output data. Setting the type bit 45 high (i.e., a binary "1") indicates that "application data" is being exchanged between the master controller 11 and the slave controller 21. The slave controller 21 is configured as a peer device when exchanging application data.

Immediately following the type bit 45 is a direction identifier 47, b4, having one (1) bit. The direction bit 47 indicates the source of the data frame 31. Setting the direction bit 47 high (i.e., a binary "1") indicates the slave controller 21 as the source of the data frame 31. Setting the direction bit 47 low (i.e., a binary "0") indicates the master controller 11 as the source of the data frame 31.

A contents identifier 49 having one (1) bit, b5, immediately follows the direction bit 47. The contents bit 49 indicates whether the data packet 35 comprises data. Setting the contents bit 49 high (i.e., a binary "1") indicates that the data packet 35 comprises no data. Setting the contents bit 49 low (i.e., a binary "0") indicates that the data packet 35 comprises data. The contents bit 49 is set high to allow the master controller 11 to query the slave controller 21 for inputs at power-up and/or reset prior to executing any logic within the master controller 11.

A state identifier 51 having one (1) bit, b6, immediately follows the contents bit 49. The state bit indicates the state of the master controller 11. The contents of the state bit 51 are recorded in the memory 27 of the slave controller 21.

Immediately following the state bit 51 is a run/stop identifier 53 having one (1) bit, b7. The run/stop bit 53 indicates the run/stop state of the master controller 11. Setting the run/stop bit 53 high (i.e., a binary "1") indicates that the master controller 11 is running. Setting the run/stop bit 53 low (i.e., a binary "0") indicates that the master controller 11 is stopped. When the data frame 31 is transmitted from the master controller 11 to the slave controller 21, the slave controller 21 follows the same run/stop state as the master controller 11.

In the Remote Link protocol, the slave controller is configured as a remote input/out device to exchange input/output data or as a peer device to exchange application data. When the slave controller 21 is configured as a remote input/output device, the master controller 11 accesses information at the input/out module 29 of the slave controller 21. The information may be in the form of real time services providing data distribution functions for exchanging data with input/output devices and messaging functions for communicating with Human-Machine Interfaces (HMI) and operator panels through the input/output module 29 of the slave controller 21.

When the slave controller 21 is configured as a peer device, the master controller 11 transmits application data or information to be interpreted by the slave processor 25. The information may be in the form of system management services used to manage and configure the slave controller 21. The information may be in the form of instructions and data combined to form an application program that can be executed on the slave processor 25. Preferably, the slave controller 21 receives an application program comprising commands and data that can be executed while the slave controller 21 receives additional commands and data that are provided as additional input to the application program. The application program can be used to execute instructions for controlling an assembly line, a robot, an actuator, and/or any device with switches. Furthermore, the slave controller 21 may be able to transmit information to the master controller 11.

If the master controller 11 attempts to access application information of the slave controller 21 that is configured as a remote input/output device, then an error response is returned to the master controller 11, which is transferred to a user application (not shown). The same error is generated when the master controller 11 attempts to access the input/output module 29 of a slave controller 21 configured as a peer device. The master controller 11 is configured to recognize what mode (remote I/O device or peer device) the slave controller 21 is in, as only one data type in a slave unit can be accessed.

Figure 4:
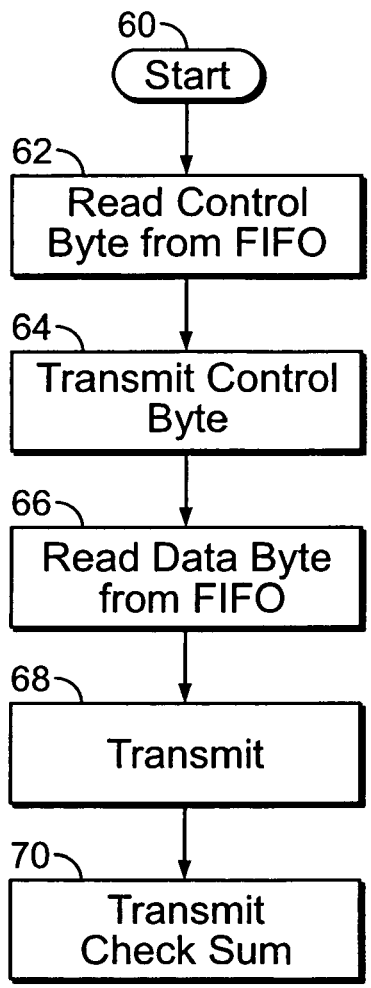
FIG. 4 is a flow chart for transmitting commands according to the distribution shown in FIG. 2 and FIG. 3; and, FIG. 5 is a flow chart for receiving commands according to the distribution shown in FIG. 2 and FIG. 3.

FIG. 4 is a flow chart for transmitting a data frame 31 according to the distribution shown in FIG. 2 and FIG. 3. Preferably, the master controller 11 shown in FIG. 1 will enable transmission procedure through a start step 60. The procedure may, for example, read information to be transmitted from a first-in-first-out register in which a sequential list of control bytes and data words is stored. Next, the master controller 11 reads 62 the control byte 33 from the first-in-first-out register and then transmits 64 the control byte 33 to the slave controller 21. Then, the master controller 11 reads 66 the data packet 35 from the first-in-first-out register and transmits 68 the data packet 35 to the slave controller 21. Finally, the master controller 11 transmits 70 the check sum byte 37 to the slave controller 21.

The flow chart of FIG. 4 shows the architecture, functionality, and operation of a possible implementation of the communication protocol software between the master controller 11 and the slave controller 21. The flow chart of FIG. 4 may be implemented in hardware, software, or a combination thereof. The software implementing the flow chart of FIG. 4 or a part thereof is called the master unit software. In this regard, each block represents a module, segment, or portion of code, which comprises one or more executable instructions for implementing the specified logical function. It should be noted that in alternative embodiments, the functions noted in the blocks shown in succession in FIG. 4 may in fact be executed substantially concurrently or the blocks may sometimes be executed in the reverse order, depending in the functionality involved.

Figure 5:
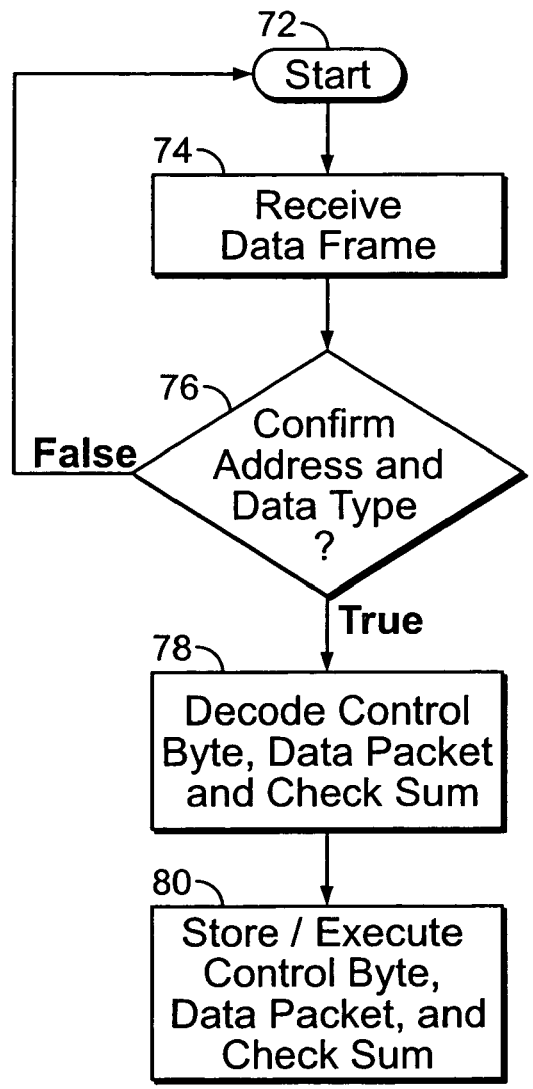

FIG. 5 is a flow chart for receiving the data frame 31 according to the distribution shown in FIG. 2 and FIG. 3. The slave controller 21 shown in FIG. 1 will be in a receiving mode, ready to receive the data frame 31. The slave controller 21 is initiated in a receiving mode 72. When the slave controller 21 is in the receiving mode, the slave controller 21 will wait for a data frame 31 and read the contents, e.g. the control byte 33, the data packet 35 and the check sum 37. When the data frame 31 is received 74, the slave controller 21 will decode the lower nibble bits (b0–b3) of the control byte 33 at the next step 76. The slave controller 21 decodes the address bits 43, b0–b2, to confirm that the data frame is addressed to that particular slave controller 21. In addition, the slave controller 21 decodes the type bit 45, b3, to determine the type of data transmitted in the data packet. The slave controller 21 confirms the address and determines the type of data being transmitted by looking only at the lower nibble. If the address bits 43 and/or the type bit 45 do not correspond with the stored configuration in the slave controller 21, the slave unit stops decoding the control byte 33 and return to a receiving mode 72 where it waits to receive a control byte 31. One clock cycle is required for the slave controller 21 to confirm the address and determine the data type. If the address bits 43 and the type bit 45 correspond to the stored configuration in the slave controller 21, the slave controller 21 decodes the higher nibble of the control byte 33, b4–b7, the data packet 35, and the check sum 37 at step 78. Then, the slave controller 21 will store and execute 80 the control byte 33 and the data packet 35 and decode the check sum 37 to confirm the accurate transmission of the data frame 31. The protocol is designed to efficiently exchange small amounts of information between the master controller 11 and the slave controller 21 in less time because the slave unit decodes the address bits 43 and the type bit 45 prior to decoding and executing instructions. The flow chart of FIG. 5 shows the architecture, functionality, and operation of a possible implementation of the communication protocol software between the master controller 11 and the slave controller 21.

The flow chart of FIG. 5 may be implemented in hardware, software, or a combination thereof. The software implementing the flow chart of FIG. 5 or a part thereof is called the slave unit software. In this regard, each block represents a module, segment, or portion of code, which comprises one or more executable instructions for implementing the specified logical function. It should be noted that in alternative embodiments, the functions noted in the blocks shown in succession in FIG. 5 may in fact be executed substantially concurrently or the blocks may sometimes be executed in the reverse order, depending in the functionality involved.

Preferably, the master controller 11 may communicate with up to seven slave controllers 21 over a communication medium wherein all the slave controllers are operably connected to the master controller 11. A slave controller 21 configured as a peer device cannot transmit data to another slave controller 21 configured as a peer device. Application programs on the peer devices must transfer information between peer devices using the master controller 11. In a single master unit/multi slave unit system, each slave controller 21 is associated with a unique address.

A practical implementation of the present invention may be hardware, software, or a combination thereof. The physical interface between the master controller 11 and the slave controller 21 can be implemented in hardware with any or a combination of the following technologies, which are well known in the art: a discrete logic circuit(s) having logic gates for implementing logic functions upon data signals, an application specific integrated circuit (ASIC) having appropriate combinational logic gates, a programmable gate array(s), a field programmable gate array (FPGA), etc.

It should be emphasized that the above-described embodiments of the present invention, particularly, any preferred embodiments, are merely possible examples of implementations, merely setting forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

I claim:

1. A system for implementing a communication protocol for facilitating transmission of a data frame having a control byte, a data packet, and a check sum byte, comprising:
    a master controller communicatively coupled to a slave controller, wherein communication between the master controller and the slave controller includes transmission of a control byte having
    a first address bit, second address bit, and third address bit for identifying an address of a slave controller;
    a type bit immediately following the first address bit, the second address bit, and the third address bit for identifying a data type in a data packet;
    a direction bit immediately following the type bit for identifying a source of a data frame;
    a content bit immediately following the direction bit for identifying whether said data packet comprises data;
    a state bit immediately following the content bit for identifying a state of the master controller; and,
    a run/stop bit immediately following the state bit for identifying a run/stop state of the master controller.

2. The system of claim 1, wherein the type bit identifies said data type as input/output data when set to 0 and identifies said data type as application data when set to 1.

3. The system of claim 1, wherein the direction bit identifies the source of said data frame as the master controller when set to 0 and identifies the source of the data frame as a slave controller when set to 1.

4. The system of claim 1, wherein the content bit indicates that said data packet contains data when set to 1 and indicates that said data packet contains no data when set to 1.

5. The system of claim 1, wherein the run/stop bit indicates that the master controller is stopped when set to 0 and indicates that the master controller is running when set to 1.

6. The system of claim 1, wherein the data frame comprises the data packet having a plurality of data words.

7. The system of claim 1, wherein the data packet comprises a first data word, a second data word, a third data word, and a fourth data word, wherein each data word comprises a first byte and a second byte.

8. The system of claim 1, wherein the data frame comprises a check sum byte comprising a two's complement ADD check of the control byte and the data packet.

9. A system for implementing a communication protocol for facilitating a transmission of a data frame between a master controller and a slave controller, comprising:
    a master controller communicatively coupled to a slave controller, wherein communication between the master controller and the slave controller includes transmission of:
    a data packet having a plurality of data words wherein each data word comprises a first byte and a second byte;
    a control byte having a first address bit, a second address bit, and a third address bit for identifying an address of a slave controller, a type bit following the first address bit, the second address bit, and the third address bit for identifying a data type within said data packet, a direction bit following the type bit for identifying a source of a data frame, a content bit following the direction bit for identifying whether said data packet comprises data, a state bit following the content bit for identifying a state of a master controller, and a run/stop bit following the state bit for identifying a run/stop state of the master controller; and,
    a check sum byte.

10. The system of claim 9, wherein the type bit identifies the data type as input/output data when set to 0 and identifies the data type as application data when set to 1.

11. The system of claim 9, wherein the direction bit identifies the source of the data as the master controller when set to 0 and identifies the source of the data as the slave controller when set to 1.

12. The system of claim 9, wherein the content bit indicates that the data packet contains data when set to 0 and indicates that the data packet contains no data when set to 1.

13. The system of claim 9, wherein the run/stop bit indicates that the master controller is stopped when set to 0 and indicates that the master controller is running when set to 1.

14. The system of claim 9, wherein the data packet comprises a first data word, a second data word, a third data word, and a fourth data word, wherein each data word comprises a first byte and a second byte.

15. The system of claim 9, wherein the check byte is a two's complement ADD check of the control byte and the data words.

16. A master controller for transmitting a data frame to a slave controller, the master controller comprising:
    means for generating a data frame wherein the data frame comprises a control byte comprising a first address bit, a second address bit, and a third address bit for identifying a slave controller, a type bit following the first address bit, the second address bit, and the third address bit for identifying a data type in a data packet, a direction following the type bit for identifying a source of the data frame, a content bit following the direction bit for identifying whether the data packet comprises data, a state bit following the content bit for identifying the state of a master controller, and a run/stop bit following the state bit for identifying a run/stop state of the master controller;
    means for transmitting the data frame from the master controller to the slave controller, wherein the data frame is interpreted by the slave controller.

17. The master controller of claim 16, wherein a processor generates the data frame.

18. The master controller of claim 17, wherein the processor is a Mitsubishi M16C.

19. The master controller of claim 16, wherein the data frame is transmitted through an EIA-485 port on to a data bus and the slave controller is operably connected to the data bus.

20. The master controller of claim 16, wherein the direction bit is set to 0 for identifying the source of the data frame as the master controller.

21. The master controller of claim 16, further comprising a means for receiving data from the slave controller in response to the direction bit of the control byte being set to 1.

22. The master controller of claim 16, wherein the data frame further comprises the data packet having a plurality of data words.

23. The master controller of claim 22, wherein the data packet comprises a first data word, a second data word, a third data word, and a fourth data word, wherein each data word comprises a first byte and a second byte.

24. The master controller of claim 16, wherein the data frame comprises a check sum byte comprising a two's complement ADD check of the control byte and the data packet.

25. A method for transmitting a data frame from a master controller to a slave controller, the method comprising the steps of:

generating a data frame wherein the data frame comprises a control byte comprising a first address bit, a second address bit, and a third address bit for identifying a slave controller, a type bit following the first address bit, the second address bit, and the third address bit for identifying a data type in a data packet, a direction following the type bit for identifying a source of the data frame, a content bit following the direction bit for identifying whether the data packet comprises data, a state bit following the content bit for identifying the state of the master controller, and a run/stop bit following the state bit for identifying a run/stop state of the master controller; and, transmitting the data frame from the master controller to the slave controller, wherein the data frame is interpreted by the slave controller.

26. The method of claim 25, wherein the data frame is transmitted through an EIA-485 port on to a data bus and the slave controller is operably connected to the data bus.

27. The method of claim 25, wherein the direction bit is set to 0 for identifying the source of the data as the master controller.

28. The method of claim 25, further comprising a step of receiving data from a slave controller in response to the direction bit being set to 1.

29. The method of claim 25, wherein the data frame further comprises the data packet having a plurality of data words.

30. The method of claim 29 wherein the data packet comprises a first data word, a second data word, a third data word, and a fourth data word, wherein each data word comprise a first byte and a second byte.

31. The method of claim 25, wherein the data frame comprises a check sum byte comprising a two's complement ADD check of the control byte and the data packet.

32. A slave controller for receiving a data frame from a master controller, the slave controller comprising:

means for receiving a data frame from a master controller wherein the data frame comprises a control byte comprising a first address bit, a second address bit, and a third address bit for identifying a slave controller, a type bit following the first address bit, the second address bit, and the third address bit for identifying a data type in a data packet, a direction following the type bit for identifying a source of the data frame, a content bit following the direction bit for identifying whether the data packet comprises data, a state bit following the content bit for identifying the state of the master controller, and a run/stop bit following the state bit for identifying a run/stop state of the master controller;

means for decoding the first address bit, the second address bit, the third address bit, and the type bit to confirm said data frame is addressed to said slave controller and said type bit corresponds to said slave controller configuration.

33. The slave controller of claim 32, wherein a processor receives the data frame.

34. The slave controller of claim 33, wherein the processor is a Mitsubishi M16C.

35. The slave controller of claim 32, wherein the data frame is received from a data bus through an EIA-485 port.

36. The slave controller of claim 32, further comprising a means for transmitting data from the slave controller to the master controller.

37. The slave controller of claim 32, wherein the data packet comprises a first data word, a second data word, a third data word, and a fourth data word, wherein each data word comprises a first byte and a second byte.

38. The slave controller of claim 32, further comprising a means for decoding the direction bit, the content bit, the state bit, and the run/stop bit.

39. The slave controller of claim 38, further comprising a means for storing the state bit in the slave controller.

* * * * *